(12) United States Patent
Sheu

(10) Patent No.: US 6,317,543 B1
(45) Date of Patent: Nov. 13, 2001

(54) CABLE WITH LUBRICATED OPTICAL FIBERS AND PROCESS OF LUBRICATING OPTICAL FIBERS

(75) Inventor: Jim J. Sheu, Dunwoody, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/443,816

(22) Filed: Nov. 19, 1999

(51) Int. Cl.[7] .................................................. G02B 6/44
(52) U.S. Cl. ...................... 385/114; 385/128; 427/163.2
(58) Field of Search ........................... 385/100–114, 128; 427/163.2

(56) References Cited

U.S. PATENT DOCUMENTS

| | | | |
|---|---|---|---|
| 4,078,853 | 3/1978 | Kempf et al. | 350/96.23 |
| 4,446,686 | 5/1984 | Panuska et al. | 57/6 |
| 4,701,016 | 10/1987 | Gartside, III et al. | 350/96.23 |
| 4,826,278 | 5/1989 | Gartside, III et al. | 350/96.23 |
| 4,844,575 | 7/1989 | Kinard et al. | 350/96.23 |
| 4,867,526 | 9/1989 | Arroyo | 350/96.23 |
| 4,900,126 | 2/1990 | Jackson et al. | 350/46.23 |
| 5,082,348 | 1/1992 | Gartside, III et al. | 385/111 |
| 5,109,457 | 4/1992 | Panuska et al. | 385/102 |
| 5,155,789 | 10/1992 | Le Noane et al. | 385/106 |
| 5,621,838 | * 4/1997 | Nomura et al. . | |
| 5,621,841 | 4/1997 | Field | 385/113 |
| 5,761,363 | * 6/1998 | Mills . | |
| 5,768,460 | * 6/1998 | Levi et al. . | |
| 6,097,866 | * 4/2000 | Yang et al. . | |

OTHER PUBLICATIONS

Pending U.S. application No. 09/179,721, entitled, "Central–Core Fiber Optic Cable Having Stranded Ribbons", filed on Oct. 21, 1998 by R. J. Brown.

* cited by examiner

*Primary Examiner*—Hung N. Ngo
(74) *Attorney, Agent, or Firm*—Thomas, Kayden, Horstemeyer & Risley, LLP

(57) ABSTRACT

A family of oil or fluid-based lubricants with an additive, for use in fabricating optical fiber cables having loose fibers or stacked optical fiber ribbons is disclosed. The additive, which can be either fumed silica, fumed alumina, or block polymers, lowers the surface tension and contact angle, and increases the viscosity and wettability of the lubricants.

17 Claims, 4 Drawing Sheets

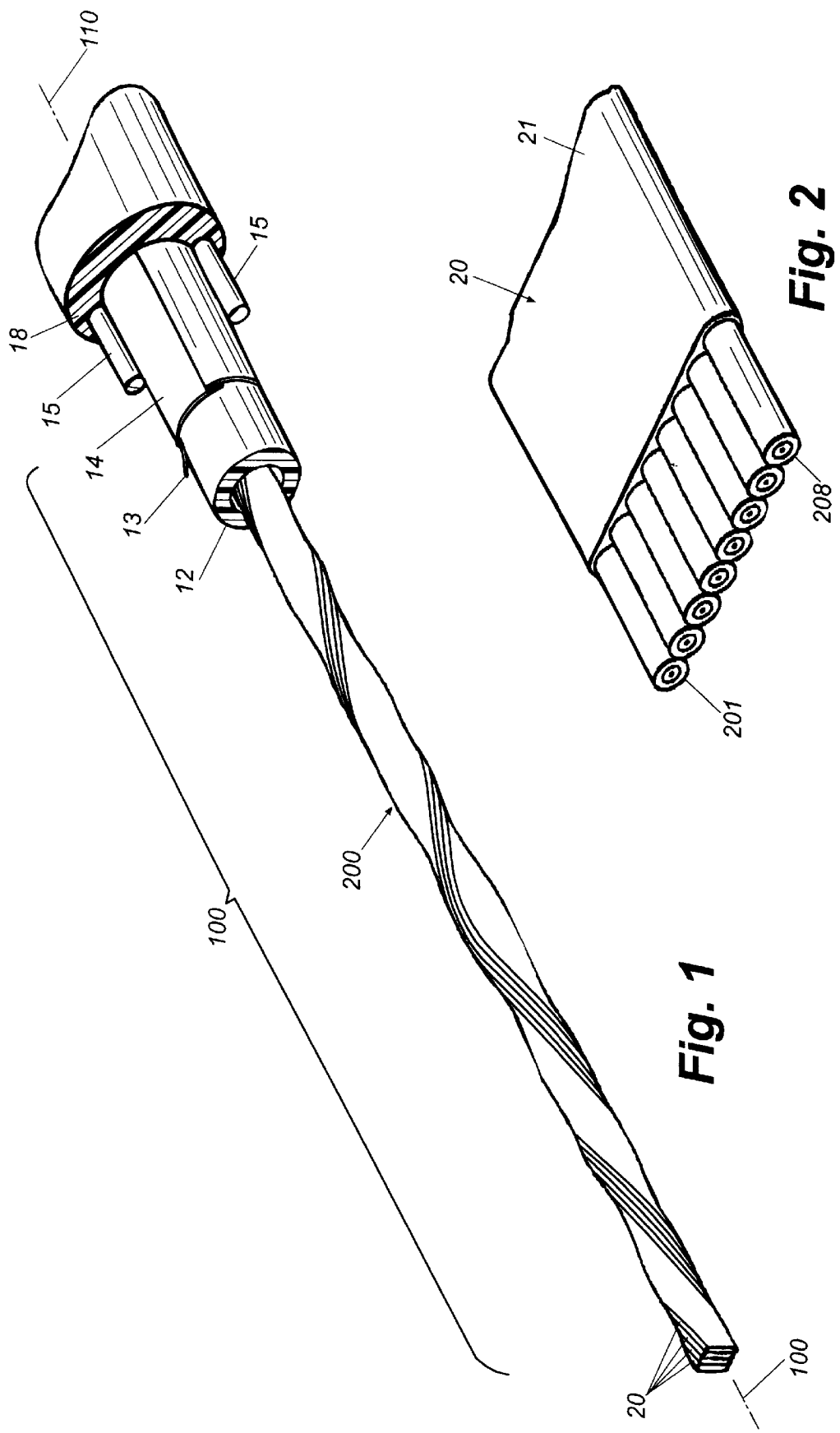

CABLE WITH LUBRICATED OPTICAL FIBERS AND PROCESS OF LUBRICATING OPTICAL FIBERS

Related Applications

This application is related to U.S. patent application Ser. No 09/179,721 of R. J. Brown et. al., filed Oct. 21, 1998, now abandoned.

TECHNICAL FIELD

The present invention relates to a communication cable design having a plurality of optical fibers, and to lubricants therefor.

BACKGROUND OF THE INVENTION

In the manufacture of optical communication cables, two design types are most frequently employed that are generally referred to as "central-core" and "loose-tube" designs. In the central-core design, a number of optical fibers are contained within a tube, which is located at the center of the cable. This cable typically includes strength members that are positioned between the central core and an outer plastic jacket. By comparison, loose-tube cable designs typically include a number of relatively small tubes that are positioned around a central strength member, and each tube encloses a number of optical fibers. In the loose-tube cable design, the fiber-containing tubes are longitudinally stranded around the central member, which is to say that the tubes are rotated around the central member along the length of the cable. An example of such a loose-tube cable design is disclosed in U.S. Pat. No. 5,621,841 to Field.

From a manufacturing standpoint, the central-core design is advantageous because it allows the various components of the cable to be assembled into their ultimate cable form in a single step rather than two or three steps as in the loose tube design. From an efficiency standpoint, optical fiber ribbon (i.e., a planar array of optical fibers that are bonded together as a unit) is advantageous because many ribbons can be stacked on top of each other within a small space. Accordingly, central-core cables having stacked optical fiber ribbons are highly desirable.

Longitudinal stranding is used in the optical cable industry to avoid subjecting individual fibers to undue tensile or compressive stress that may occur when the cable is bent. Such stress not only modifies the transmission characteristics of a fiber but also leads to breakage in extreme situations. In this industry, two types of longitudinal stranding are known: "continuous" and "S–Z." Continuous stranding is a process in which one or more strands of material (e.g., optical fibers) are helically rotated in a single direction along the longitudinal axis of the cable; whereas in S–Z stranding, the direction of rotation periodically reverses. S–Z stranding is preferred because it achieves the benefits of longitudinal stranding without the need for heavy machinery to lift and rotate large reels of strand material and it removes limits on the length of component materials. (Heretofore, stranding a stack of optical fiber ribbons in a central-core cable has been undesirable because transmission loss is significantly increased. This increase is frequently referred to as "cabling" loss since it is wholly attributable to the installation of transmission media [i.e., the ribbon stack] in a cable.) Furthermore, S–Z stranding has been difficult to achieve because twisted material tends to unwind at the point of reversal owing to inherent physical forces (restorative forces) that are created when a relatively stiff body is twisted —much like a torsion spring. This difficulty is exacerbated when the stiffness is increased, such as by stacking and bonding fiber ribbons together in a single unit.

In the formation of stacked ribbons, there is a tendency for the ribbons to stick together during sheathing which can create microbending, resulting in increased losses in the cable. The addition of suitable lubricant between the ribbons has resulted in substantially eliminating such losses. However, it has been found that many lubricants, e.g., oils, can present additional problems, stemming from characteristics of the lubricant such as viscosity, surface tension, contact angle, and surface wetting. These characteristics can lead to inadequate lubricating of the ribbons with a consequent increase in losses. Accordingly, what is desired and what the industry presently lacks is a central-core optical cable having the individual fibers or the ribbons adequately lubricated with the lubricant having high viscosity, low surface tension, and a small contact angle.

SUMMARY OF THE INVENTION

The foregoing problems have been overcome by a cable having two or more optical fiber ribbons, which are stacked in an array, or optical fibers loosely disposed within a tube that is positioned within the cable. An improved coating comprising a lubricant and an additive is applied between adjacent fibers or ribbons of the stack in order to hold the fibers or ribbons together as a unit and to facilitate sliding movement between the fibers or ribbons.

The lubricant of the present invention is, for example, a polyalphaolefin oil, a silicone fluid, an ester oil or a mineral oil, with an additive which, in accordance with the invention, has a lowered surface tension and a smaller contact angle than lubricants known in the art without the additive, which will be discussed hereinafter. The contact angle is a measure of beading of the oil and hence, indirectly, a measure of the wetting properties of the oil. The surface tension is also a factor in the wetting of the fiber or ribbon surface, and a relatively low surface tension produces more complete wetting. In addition, a cable containing loose fibers or stacked ribbons is generally filled with a filling material (such as a water blocking viscous gel) which itself functions as a lubricant. The lubricant of the present invention can be used both in a cable containing the filling material and in a cable lacking the filling material, a "dry core" cable.

The lubricant of the invention, therefore, functions to hold the loose fibers or the stack of ribbons together, to permit sliding of the fibers or ribbons relative to each other, and to reduce transmission losses in the cable. Also, the stack of ribbons is twisted in one direction for a first predetermined distance, and then twisted in the opposite direction for a second predetermined distance to help hold ribbons together without requiring heavy machinery to rotate the cable in a true helix. These distances are preferably equal to each other.

BRIEF DESCRIPTION OF THE DRAWINGS

Other features of the present invention will be more readily understood from the following detailed description of specific embodiments thereof when read in conjunction with the accompany drawings, in which:

FIG. 1 is a partial, cut away perspective view of a central-core optical cable in accordance with one embodiment of the present invention;

FIG. 2 is a partial perspective view of an optical fiber ribbon showing a group of coated glass fibers bonded together with a matrix material;

DETAILED DESCRIPTION

Figure 3A:
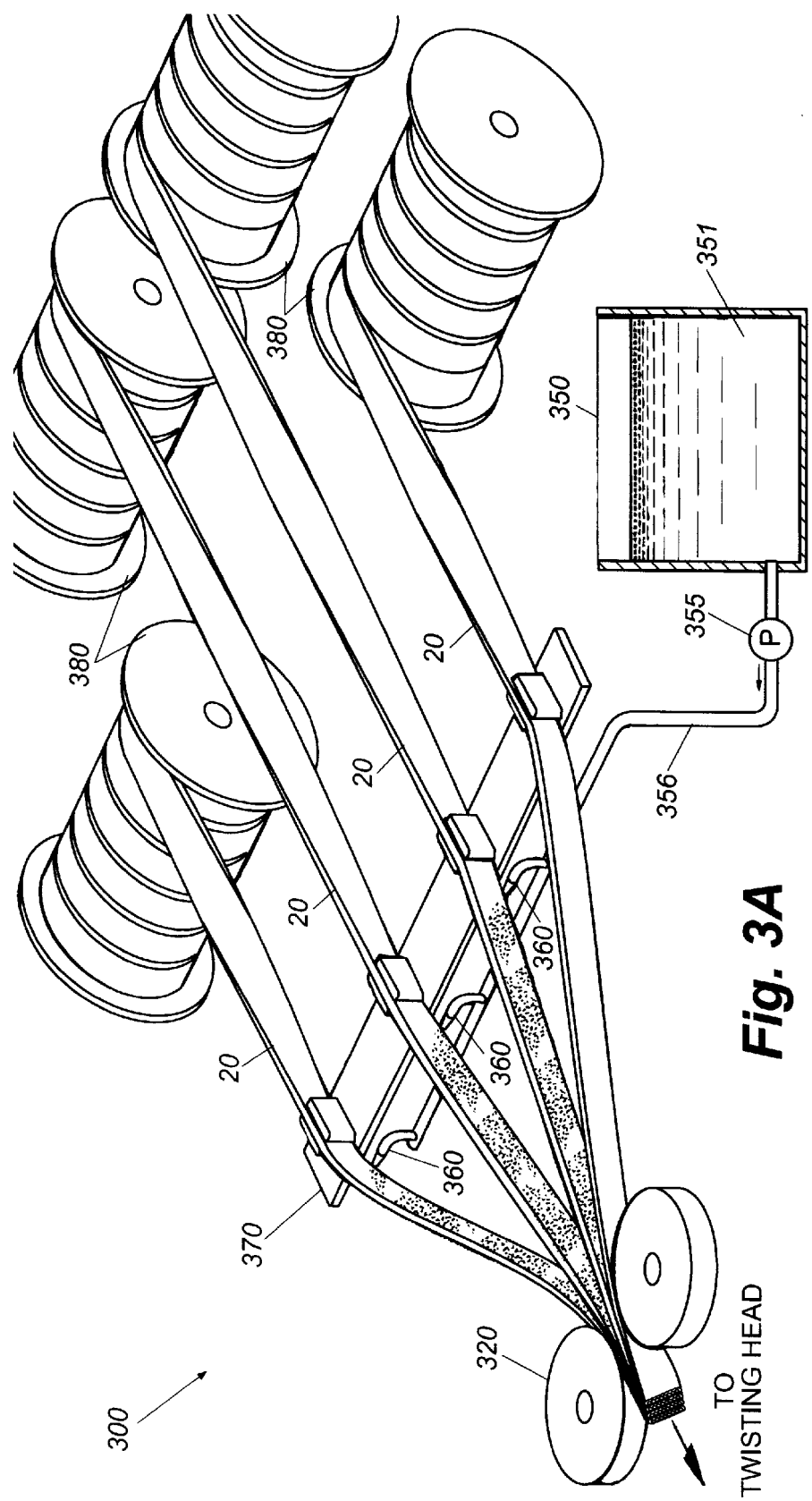
FIGS. 3A and 3B are diagrammatic views of an apparatus that is suitable for imparting a controlled helical twist on a stack of optical ribbons, particularly when the twist reverses direction periodically.

FIG. 1 discloses a central-core cable 100 having a stack 200 of lightguide fiber ribbons 20, with each ribbon comprising a number of light-transmitting optical fibers aligned in a planar array. Ribbon stack 200 is disposed within a tubular member 12 that is made from a polymeric material such as polypropylene, polyvinyl chloride or polyethylene, and surrounded by a sheath system. A water-blocking tape 14 wraps around the tubular member 12 and is used to prevent water that has entered the cable 100 from propagating along the direction of the longitudinal axis 110—110 of the cable. Such a tape is shown in U.S. Pat. No. 4,867,526 to Arroyo, which is incorporated herein by reference. Surrounding the water-blocking tape 14 is a plastic jacket 18 that, illustratively, is made from a polyethylene material. A ripcord 13, made of Kevlar® yarn, facilitates removal of this sheath system. Additionally, strength members 15 may be included within cable 100 in order to provide tensile strength and preclude compressive (shrinkage) stresses applied to the plastic jacket 18, from being transferred to the optical fibers within the ribbon stack 200.

Desirably, the strength members 15 are an integral part of the jacket 18 and function together as a unit. The strength members 15 are characterized by a tensile modulus, e.g., 10,000,000 –30,000,000 psi, that is higher than the tensile modulus of the fibers in order to minimize the strain on the fibers in the load range of interest. The strength members 15 may be stainless steel wires; however, other materials, metallic or nonmetallic, such as graphite or aramid rods or Kevlar yarn can be used. Also, the strength members can be composite structures comprising any of a number of high modulus materials.

The specific design of the sheath system is not critical to the novel aspects of the present invention. However, for the sake of completeness, various forms of acceptable sheath designs and constructions are provided in the following commonly assigned U.S. Pat. Nos. 4,078,853 to Kempf, et. al.; 4,826,278 to Gartside III et. al.; 4,844,575 to Kinard, et. al.; 5,082,348 to Gartside, III, et. al. and 5,109,457 to Ranuska, et. al., which are incorporated herein by reference.

As stated above with regard to the sheath system, the particular design and construction of optical ribbon 20 is not critical to the implementation of the present invention. Nevertheless, one acceptable ribbon design is shown in FIG. 2 and described in U.S. Pat. No. 4,900,126 to Jackson, et. al., which is incorporated herein by reference. Briefly, optical fiber ribbon 20 comprises a group of coated glass fibers 201–208 that are held together with an ultraviolet (UV)-curable matrix bonding material 21. The group of optical fibers are disposed in a coplanar parallel array, and while only eight (8) fibers are shown, such arrays frequently comprise twelve or more individual fibers. The matrix material 21 fills the interstices, bonds together the optical fibers, and extends to the outside boundary of the ribbon. Known UV-curable matrix materials 21 comprise a resin, a diluent and a photoinitiator. The resin may include a diethylenic-terminated resin synthesized from a reaction of a hydroxy-terminated alkyl acrylate with the reaction product of a polyester of polyether polyol of molecular weight of 1000 to 6000 with an aliphatic or aromatic diisocyanate, or a diethylenic-terminated resin synthesized from the reaction of glycidyl acrylate with a carboxylic-terminated polymer or polyether of molecular weight 1000 to 6000. The diluent may comprise monofunctional or multifunctional acrylic acid esters having a molecular weight of 100 to 1000 or N-vinylpyrrolidinone. For the photoinitiator, the composition may include ketonic compounds such as diethoxyacetophenone, acetophenone, benzophenone, benzoin, anthraquinone, and benzyl dimethyl ketal. In a typical composition, the bonding matrix may include a resin (50–90%), diluents (5–40%), and a photoinitiator (1–10%). All percentages are by weight unless otherwise noted. Other bonding matrices may include a methacrylate, an UV-curing epoxide or an unsaturated polyester.

Figure 3B:
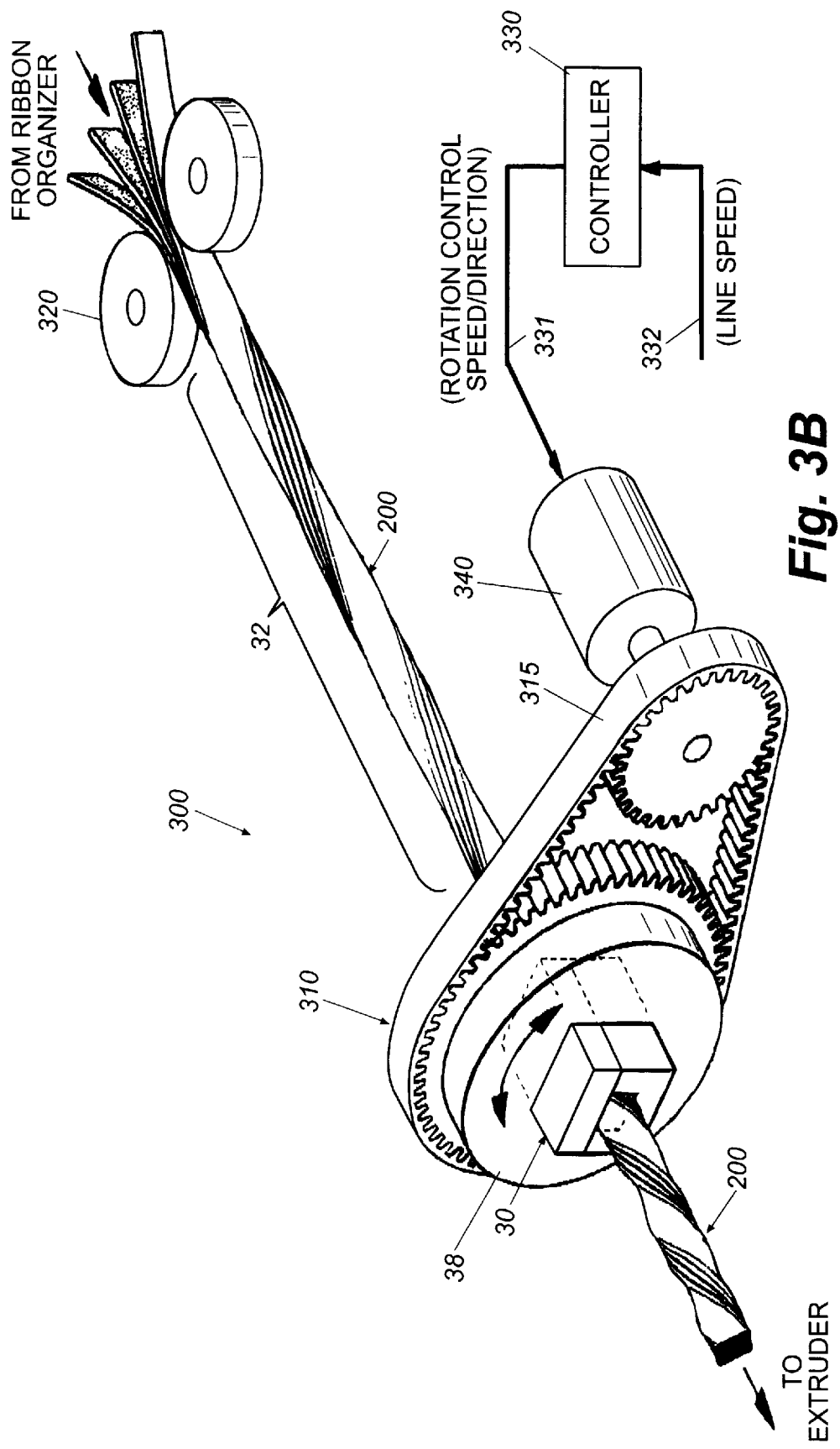

FIGS. 3A and 3B disclose the operation of an S–Z stranding apparatus 300 for optical ribbons in accordance with the present invention. The operation begins by dispensing or "paying off" a collection of ribbons 20 from payoff reels 380. The ribbons 20 pass through a guide 370 in a side-by-side arrangement with the ribbon width oriented up and down, i.e., individual fibers of each ribbon are vertically aligned, and the ribbons 20 are in close proximity, one inch or less, to each other. While maintaining this arrangement, the collection of optical ribbons are exposed to lubricant dispensers 360, which coat the flat side(s) of the selected ribbons 20 with a lubricant 351 and an additive in order to provide lubrication and adhesion between adjacent ribbons. The lubricant-dispensing device may simply be a pump 355 that is connected by tubing 356 between a lubricant-containing reservoir 350 and the dispensers 360. The ribbons are then brought together in a stacked configuration with two flat-bottomed sheaves or guides 320. At this point, the ribbons are pressed together in a manner that allows the surface tension of the lubricant 351 to "bond" the ribbons together in a single stack 200 to take on the physical properties of a single unit.

Figure 4:
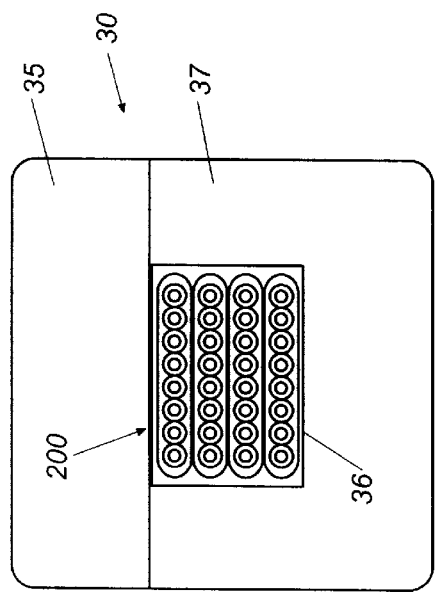
FIG. 4 is an elevational view of a twisting guide used in the apparatus of FIG. 3B.

Once established, the stack 200 enters linear accumulator 32 (FIG. 3B), which may be nothing more than a longitudinal section of the manufacturing line where the ribbon stack 200 is essentially unencumbered. Ribbon stack 200 traverses the linear accumulator 32 and enters a twisting assembly 310 that includes a twisting guide 30 that is mounted in a motorized head 38. The motorized head 38 is driven by a ribbed belt 315 which, in turn, is driven by a motor 340. The twisting guide 30 is shown in greater detail in FIG. 4, and it comprises a two-piece assembly for capturing and holding a moving ribbon stack 200. Twisting guide 30 includes top and bottom portions 35, 37 that fit together and provide an opening 36, which is tapered at the ribbon entrance end. The cross section of the opening 36 is slightly larger than the cross section of the ribbon stack 200. Moreover, the geometric center of the opening 36 is positioned on the axis of rotation of the ribbon stack 200 so that the ribbon stack does not wobble from side to side during stranding.

The twisting guide 30 rotates at a rate that is proportional to the line speed of the ribbon stack in order to create the desired lay, i.e., twist pattern. "Lay" is generally characterized in terms of the number of complete rotations per unit length and the rotational direction. For example, a 2-foot lay length means that the ribbon stack makes one complete revolution every 2 feet of cable length. As the twisting guide 30 rotates, a twist is put into the ribbon stack 200 that progresses toward the end of the manufacturing line away from payoff reels 380 shown in FIG. 3A. However, as twisting guide 30 rotates, not only is the downstream portion of the ribbon stack rotated, but the upstream portion, within accumulator 32, of the ribbon stack is also rotated. The twisting guide 30 is rotated in a first direction until the desired number of twists are introduced into the ribbon stack 200. As this occurs, the ribbon stack 200 within the linear accumulator 32, gets tighter and tighter until the twisting guide 30 reverses its rotational direction. It should be noted that numerous techniques may be used to determine when to reverse direction. For example, the specific number of twists may be counted, a helix angle detector may be used to evaluate the ribbon positions, or load cells may be employed to sense the torque of the ribbon stack itself.

The controller 300 is preferably arranged to reverse the rotational direction of a motor 340, which drives the twisting guide 30, after a predetermined number of twists. Information regarding line speed is fed into the controller 330 on input line 332, and signals which control the direction and speed of rotation are fed to the motor 340 on output line 331. As a result of this reversal, the motorized head 38 begins taking out twists from the ribbon stack 200 in the linear accumulator 32 and causing the portion of the ribbon stack 200 progressing down the manufacturing line away from the payoff reels 380 to have a longitudinal stranding in a rotational direction opposite from that of a portion of ribbon stack 200 passing through the twisting guide 30 before its rotational direction reverses.

This procedure continues until the twists are all removed and there is no lay in the linear accumulator 32; but the rotation of the ribbon stack continues, without interruption, until an equal number of twists, in the opposing direction, are imparted onto the ribbon stack 200 within the accumulator. Twisting guide 30 then changes rotational direction and the process repeats until a desired length of cable is manufactured.

It is known throughout the industry that if one side of a ribbon array is tighter than the other, then the array will veer toward that side, which is to say that a "bias" exists. However, if there are too few twists between reversals, then a bias will be created unless the twist pattern is precisely controlled. While the twisting guide 30 may change direction at a precise point, the twist pattern does not. Rather, the restorative force of the twisted ribbon stack 200 creates a transition region where the twist pattern partially unwinds in the region of twist reversal. Accordingly, it has been empirically determined from measurements and tests performed under typical manufacturing conditions, e.g., a manufacturing line over about 100 feet long, running at between 25–200 feet per minute, that the effective lay approaches the targeted lay at about 15 to 20 feet from the center of the reversal. In one particular embodiment of the Brown et. al. patent application, Ser. No. 09/179,721,the length between reversals is at least 30 feet. For a 2-foot lay length, this requires a minimum of 15 twists in each direction.

After the ribbon stack 200 is stranded, it advances through an extruder (not shown) which causes a plastic material to be extruded around the core to form the core tube 12 (see FIG. 1). Beyond the extruder, the core tube containing the stranded ribbon stack is passed through a cooling trough (not shown), which is exposed to a negative pressure. This causes the core tube to expand away from the ribbon stack 200 as it cools. As a result, a loose fitting tube is formed about the ribbon stack that permits relative movement between the ribbon stack and the tube. Thereafter, ripcord 13, water-blocking tape 14, and strength members 15 are introduced, as well as a filling gel, if desired. Tension is maintained on the strength members 15 as they enter a second extruder (not shown) that aids in holding them in their precise positions as an outer jacket 18, preferably polyethylene, is extruded thereover.

While the central-core design, with ribbon stacks disposed therein, represent the preferred embodiment for use of the lubricant, other cables and designs may implement the lubricant as well. For example, loose-tube cable designs, and cables which incorporated optical fibers loosely disposed within the cable may also use the lubricant and additive of the present invention.

Because it is desirable to protect the hair-thin optical fibers from tensile stresses applied to the cable, the fibers need to be longer than the cable itself. This is achieved with what is known as a "big wheel," such as shown in U.S. Pat. No. 4,446,686 to Panuska, et. al., which stretches the cable between itself and a belt capstan in a straight line such that the fiber is installed in a stretched cable. After the cable leaves the "big wheel" after making several wraps, the sheath relaxes and the result is that excess fiber length is created with respect to cable length.

Figure 5C:
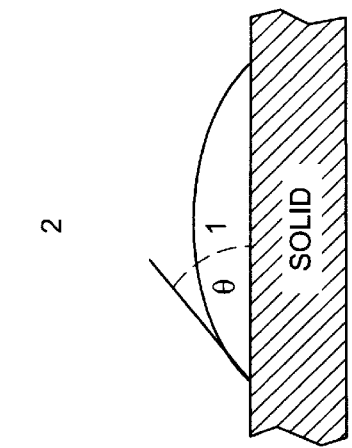
FIGS. 5A through 5C are diagrams illustrating three different degrees of wetting by a lubricant.
Figure 5B:
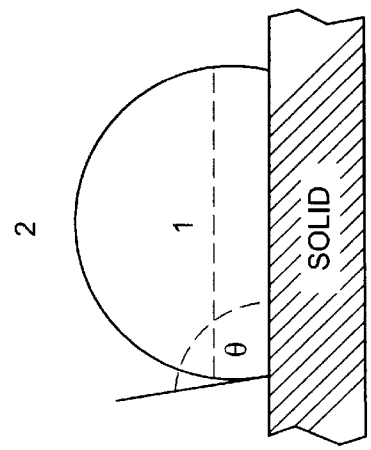
Figure 5A:
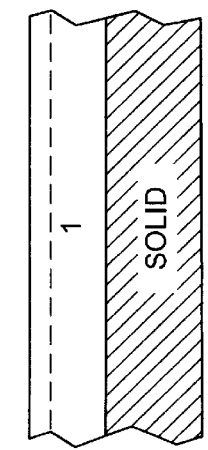

In accordance with the present invention, the lubricant 351 of the present invention is a lubricant with an additive which meets the criteria of being characterized by a lowered surface tension and a smaller contact angle than a lubricant without the additive. In FIG. 5 there are shown three different degrees of wetting, i.e. (a) complete wetting, (b) beading, and (c) wetting that is greater than (b) but less than (a). These are three-phase equilibrium diagrams between the solid (ribbon), liquid phase (1) and immiscible phase (2) (air). It can be seen in (b) that the surface tension is great enough to cause beading, forming a contact angle θ between a tangent to the bead at the point of contact with the surface and the surface. As can be seen, angle θ is greater than 90°. In (c) the surface tension of the oil is much less, and as a result, the contact angle θ is considerably less than that in (b). Thus, the contact angle is an indirect indication of the wetting. The present invention exhibits a much better wetting on the surfaces of the fiber coating and ribbon matrix than lubricants heretofore known in the art. The additive for the lubricant is selected from the group consisting of: fumed silica, fumed alumina, and block polymers.

In addition to surface tension and contact angle, a third characteristic of the present invention is the viscosity thereof at different temperatures. The viscosity of some lubricants is more sensitive to temperature changes than that of others, and, at room temperature, the lubricants of the present invention have higher viscosities. The lubricants will stay on the outside of the individual fibers or the ribbon stacks and between the fibers or ribbon stacks during the S–Z stranding. The cabling steps that immediately follow the lubrication are either application of filling material and/or extrusion of the central core. These lubricants will come in contact with either the filling compound or the core tube material at much higher temperatures. The viscosities of the lubricants decrease quickly to lower levels from at room temperature to about 60° C. and above. Viscosities of lubricants at these low levels help in mixing with and bring the filling material onto the fibers or into the ribbon stacks. As mentioned before, coverage of lubricant or filling material is desired for minimizing the microbending optical loss of the fibers. In a regular (non S–Z) ribbon cabling process, a lubricant which is less sensitive to the temperature change may be preferable. The lubricants of the present invention have adequately low viscosities at room temperature suitable for the lubricating device for the operation. Viscosities of these lubricants stay at about the same levels such that they will also help in mixing with and bring the filling material onto the fibers or into the ribbon stacks when in contact with the filling material at much higher temperatures. Examples of lubricants that exhibit the temperature dependence of viscosity are disclosed in U.S. patent application Ser. No. 09/320,205 of Brown et. al., filed on May 25, 1999, which application is incorporated herein by reference.

Tables 1 and 2 below are charts showing the characteristics of several different lubricant mixtures such as average surface tension and average contact angle on the ribbon matrix surface.

TABLE 1

Contact Angle (Kruss Instrument)
Surface: Matrix cured at 0.7 J/cm$^2$, glass cured side up

| Sample | Average Contact Angle | σ Contact Angle |
| --- | --- | --- |
| Type H oil | 30.9° | 3.6° |
| Type I oil | 56.0° | 9.5° |
| E-C 121-5 Oil ($J_3$ oil) | 24.6° | 3.5° |
| E-C 121-7 Oil ($J_2$ oil) | 25.3° | 10.3° |
| S-50-5 Oil ($J_1$ oil) | 9.0° | 1.8° |

TABLE 2

Surface Tension (Cahn Dynamic Contact Angle Analyzer)

| | Advancing Surface Tension | | Receding Surface Tension | |
| --- | --- | --- | --- | --- |
| Sample | Glass | Matrix | Glass | Matrix |
| Type H Oil | 16.37 | 17.75 | 33.15 | 33.86 |
| Type I Oil | 11.2 | 10.14 | 40.41 | 42.18 |
| E-C 121-5 Oil ($J_3$ Oil) | 18.61 | 16.08 | 30.70 | 30.24 |
| E-C 121-7 Oil ($J_2$ Oil) | 14.96 | 14.78 | 29.84 | 29.94 |
| S-50-5 Oil ($J_1$ Oil) | 18.61 | 18.26 | 22.05 | 22.25 |

Where
H oil consists of 73.7% Mobil SHF 82 ®, 22.8% Mobil SHF 404 ®, 2.0% Irganox 1076 ®, 1.5% Cab-O-Sil TS 720 ®;
I oil consists of 96.2% Mobil SHF 404 ®, 2.0% Irganox 1076 ®, 1.8% Cab-O-Sil TS 720 ®;
$J_1$ oil consists of 96.2% GE Silicones SF-96-50 ®, 2.0% Irganox 1076 ®, 1.8% Cab-O-Sil TS 530 ®;
$J_2$ oil consists of 96.2% Mobil Ester C-121 ®, 2.0% Irganox 1076 ®, 1.8% Cab-O-Sil TS 720 ®; and
$J_3$ oil consists of 96.2% Mobil Ester C-121 ®, 2.0% Irganox 1076 ®, 1.8% Cab-O-Sil TS 530 ®.

As an example, Type H lubricant comprises 22.8% by weight of SHF 404® polyalphaolefin oil, 73.7% by weight of SHF-82® polyalphaolefin oil, 2% by weight of Irganox 1076® antioxidant and 1.5% Cab-O-Sil TS 720® fumed silica. SHF-402® (or 404®) and SHF-82® are commercially available from Mobil Chemical Company, the antioxidant (stabilizer) is commercially available from the Ciba-Geigy Company and the fumed silica is commercially available from Cabot Corporation. The type H lubricant was selected to be compatible with the oils or gels used in a filling material, e.g., gel, that may, optionally, be included within the core tube 12 (see FIG. 1). It can be seen in Tables 1 and 2 that the surface tension and contact angle for type H lubricant are well within the limits of the present invention, thus making type H lubricant one embodiment of the invention. Type I lubricant, which comprises 96.2% Mobil SHF 404® polyalphaolefin oil, 2% Irganox 1076® and 1.8% Cab-O-Sil TS 720® fumed silica is likewise a suitable choice.

Other lubricants, as can be seen from the Tables 1 and 2 also satisfy the criteria of the present invention, although the viscosity characteristics are important depending the applications. In all cases, the antioxidant is optional. Within these ranges, the lubricant performs as set forth in the foregoing.

Lubricant 351 that comprises an ester oil is a preferred embodiment of the present invention because the ester oil allows use of a wider range of core tube and sheathing materials without making them sticky. Therefore, the ester oil is more compatible with the core tube, buffer tube or sheath. This is of particular use in the new cable designs which use a thin layer of sheathing material, the so-called "microsheath" designs. One example of a preferred ester oil lubricant is the $J_2$ oil (data given in Tables 1 and 2) which comprises 96.2% Mobil Ester C-121®, 2.0% of Irganox 1076® antioxidant, and 1.8% Cab-O-Sil TS 720® fumed silica. Another example of a preferred ester oil lubricant is the $J_3$ oil (data given in Tables 1 and 2) which comprises 96.2% Mobil Ester C-121®, 2.0% Irganox 1076®, and 1.8% Cab-O-Sil TS 530® fumed silica.

Lubricating materials other than those specifically disclosed may be used, provided they meet the specific criteria as to characteristics as herein set forth. Examples of such oils or fluids are synthetic hydrocarbon oils such as polyalkane oils, e.g., polypropylene oil or polybutene oil; polyalkane glycols such as polypropylene glycols, polyethylene glycols or polybutylene glycols; chlorinated paraffin oil; polymerized ester oil; polysilanes and polysiloxanes, such as silicone fluid; petroleum crude oil based oil, treated or untreated such as 150 solvent neutral, mineral oil or white oil; and/or triglyceride-based vegetable oil such as castor oil. It is also within the scope of the invention that various mixtures of these oils may be used. In all cases, the material used should satisfy the criteria of the invention as set forth hereinbefore.

As disclosed hereinbefore, the additive to the oils or fluids is selected from the group consisting of: fumed silica, fumed alumina, or block polymers. The fumed silica is preferred because it is cheaper and less additive is necessary, less that 2% by weight, in order to achieve the desired result. An example of fumed silica is the Cab-O-Sil 720® disclosed hereinbefore. An example of fumed alumina, available from Cabot Corporation, has a BET surface area of 145 m$^2$/g. Two other grades that can also be used: 105 m$^2$/g and 55 m$^2$/g. Block polymers may also be used, such as polyethylene polymers or polypropylene polymers, etc. An example of a preferred block polymer is Kraton®, available commercially from Shell Chemical Company. In all cases, the additive used should satisfy the criteria of the invention as set forth hereinbefore.

Although various particular embodiments of the present invention have been shown and described, modifications are possible within the spirit and scope of the invention.

What is claimed is:

1. The process of preparing optical fibers for loading into a dry core cable comprising the steps of:
    exposing optical fibers to a lubricant-dispensing device;
    coating the fibers with a lubricant and an additive for said lubricant;
    pressing the fibers together in a manner that allows said lubricant to bond the fibers together in a single stack.

2. The process of preparing optical fibers for loading into a dry core cable comprising the steps of:
    exposing optical fibers to a lubricant-dispensing device;
    coating the fibers with a lubricant and an additive for said lubricant, wherein said additive lowers the contact angle of said lubricant;
    pressing the fibers together in a manner that allows said lubricant to bond the fibers together in a single stack.

3. The process of preparing optical fibers for loading into a dry core cable comprising the steps of:

exposing optical fibers to a lubricant-dispensing device;

coating the fibers with a lubricant and an additive for said lubricant, wherein said additive decreases surface tension of said lubricant;

pressing the fibers together in a manner that allows said lubricant to bond the fibers together in a single stack.

4. The process of preparing optical fibers for loading into a dry core cable comprising the steps of:

exposing optical fibers to a lubricant-dispensing device;

coating the fibers with a lubricant and an additive for said lubricant, wherein said additive both lowers the contact angle of said lubricant and decreases surface tension of said lubricant;

pressing the fibers together in a manner that allows said lubricant to bond the fibers together in a single stack.

5. The process of preparing optical fibers for loading into a dry core cable comprising the steps of:

exposing optical fibers to a lubricant-dispensing device;

coating the fibers with a lubricant and an additive for said lubricant, wherein said additive comprises silica;

pressing the fibers together in a manner that allows said lubricant to bond the fibers together in a single stack.

6. The process of preparing optical fibers for loading into a dry core cable comprising the steps of:

exposing optical fibers to a lubricant-dispensing device;

coating the fibers with a lubricant and an additive for said lubricant, wherein said additive comprises alumina;

pressing the fibers together in a manner that allows said lubricant to bond the fibers together in a single stack.

7. The process of preparing optical fibers for loading into a dry core cable comprising the steps of:

exposing optical fibers to a lubricant-dispensing device;

coating the fibers with a lubricant and an additive for said lubricant, wherein said additive comprises block polymers;

pressing the fibers together in a manner that allows said lubricant to bond the fibers together in a single stack.

8. The process of preparing optical fibers for loading into a dry core cable comprising the steps of:

exposing optical fibers to a lubricant-dispensing device;

coating the fibers with a lubricant and an additive for said lubricant, wherein said additive is selected from the group consisting of: fumed silica, fumed alumina, and block polymers;

pressing the fibers together in a manner that allows said lubricant to bond the fibers together in a single stack.

9. A dry core fiber optic cable comprising optical fibers having a coating, said coating comprising lubricant, and an additive for said lubricant, said fibers being pressed together in manner that allows said lubricant to bond said fibers together in a single stack.

10. The process of preparing optical fibers for loading into a dry core cable comprising the steps of:

exposing optical fibers to a lubricant-dispensing device;

coating the fibers with a lubricant and an additive for said lubricant, wherein said lubricant is selected from the group consisting of: polyalphaolefin oil, mineral oil, synthetic hydrocarbon oil, polyalkane glycol, chlorinated paraffin oil, polymerized ester, polysilane oil, polysiloxane oil, petroleum based oil, triglyceride-based vegetable oil, block polymers, and silicone fluid; and pressing the fibers together in a manner that allows said lubricant to bond the fibers together in a single stack.

11. The process of claim 10, wherein said additive is selected from the group consisting of: fumed silica, fumed alumina, and block polymers.

12. The process of claim 10, wherein said additive lowers the contact angle of said lubricant.

13. The process of claim 10, wherein said additive decreases surface tension of said lubricant.

14. The process of claim 10, wherein said additive both lowers the contact angle of said lubricant and decreases surface tension of said lubricant.

15. The process of claim 10, wherein said additive comprises silica.

16. The process of claim 10, wherein said additive comprises alumna.

17. The process of claim 10, wherein said additive comprises block polymers.

* * * * *